United States Patent [19]

Lawassani et al.

[11] Patent Number: 4,921,300
[45] Date of Patent: May 1, 1990

[54] VEHICLE SUN VISOR MOUNTING ARRANGEMENT

[75] Inventors: Abdi Lawassani, Pontiac; James D. Dowd, Farmington Hills; David M. Hilborn, Sterling Heights, all of Mich.

[73] Assignee: United Technologies Automotive, Inc., Dearborn, Mich.

[21] Appl. No.: 278,087

[22] Filed: Nov. 30, 1988

[51] Int. Cl.$^5$ .............................................. B60J 3/02
[52] U.S. Cl. ............................... 296/97.11; 296/97.12
[58] Field of Search ................. 296/97.1, 97.9, 97.12, 296/97.13, 97.11

[56] References Cited

U.S. PATENT DOCUMENTS

| | | | |
|---|---|---|---|
| 2,294,317 | 3/1940 | Pelcher et al. | 296/97.11 |
| 2,496,129 | 12/1944 | Moore | 296/97.13 |
| 2,832,558 | 3/1955 | Lange | 296/97.13 |
| 3,378,297 | 5/1966 | Ternes et al. | 296/97.9 |
| 4,500,131 | 2/1985 | Fleming | 296/97.12 |

FOREIGN PATENT DOCUMENTS 3002124  7/1981  Fed. Rep. of Germany ..... 296/97.9

Primary Examiner—Robert R. Song

[57] ABSTRACT

A sun visor panel (30) having a channel (40) along a forward edge thereof is provided with a mounting clip (50) including a resilient tab (65) which snaps and locks the visor panel into a stored position and a pair of open eyelets (70) which frictionally hold the visor panel in any of various angularly adjusted positions on a mounting rod. A pair of claw-shaped guides (80) function with a pair of visor panel end bushings (45) to bear lateral adjustment of visor panel position along the rod.

4 Claims, 2 Drawing Sheets

4,921,300

VEHICLE SUN VISOR MOUNTING ARRANGEMENT

TECHNICAL FIELD

This invention relates generally to sun shades for automobiles and similar vehicles, and particularly to a novel mounting arrangement for the visor panels employed in such sun shades.

BACKGROUND ART

The passenger compartments of vehicles such as automobiles and trucks are usually equipped with sun shades comprising one or more visor panels mounted on a rod or the like, which panels pivot downwardly from a stored position against the ceiling of the vehicle, to various lower positions for shielding the eyes of a passenger and/or operator from sunlight. Certain of such visor panels are laterally adjustable in position along the mounting rod for enhanced shielding effectiveness.

It will be appreciated that a sun visor mounting arrangement for such sun visor panels must provide for the positive retention of the visor panel against the vehicle's ceiling for storage, yet accommodate pivotal adjustability of the visor panel and lateral adjustability of the visor panel along the longitudinal axis of the mounting rod. For simplicity of assembly, such a mounting arrangement should be formed from as few separate components as possible, and include means therein for minimizing annoying rattles and vibrations and enhancing the smooth adjustment of the visor panel both in pivotal and laterally movable modes.

While various prior art mounting arrangements provide for the pivotal adjustment of a visor panel about a mounting rod therefor, they do not provide any mechanism for smoothly guiding a visor panel along the mounting rod for the lateral adjustment of the position of the panel. Moreover, such prior art mounting arrangements often use a single means to both retain the visor panel in a stored position and frictionally hold the visor panel in various angularly adjusted positions about the mounting rod. Accordingly, such retention and adjustment means tend to be relatively complex in shape and may be incapable of optimally performing either one of the retention or adjustment functions due to the requirements placed thereon for the performance of the other such function.

DISCLOSURE OF INVENTION

It is, therefore, an object of the present invention to provide an improved sun visor panel mounting arrangement which is capable of retaining the visor panel in a stored position against a vehicle ceiling, and accommodating the pivotal adjustment of the sun visor panel as well as the lateral positioning thereof along a mounting member such as the rod or the like.

It is another object of the present invention to provide such a mounting arrangement in a minimal number of separate component parts for economy of construction and simplicity of assembly.

It is yet another object of the present invention to provide such a visor mounting arrangement which is relatively free of annoying rattles and vibrations during operation of the vehicle.

These and other objects which will become more readily apparent from the following detailed description and appended claims, are achieved in part by a novel visor panel mounting clip which includes a first detent for holding the sun visor in a stored position against the vehicle roof, a second detent, independent from the first, for maintaining the angular adjustment of the visor panel's position on a mounting rod therefor, and means for smoothly guiding the sun visor panel along a mounting rod for the lateral positioning of the visor panel. In the preferred embodiment, the clip comprises a generally U-shaped member including a pair of flanges connected by a bight portion, the first detent comprising a resilient tab extending integrally from one of the flanges and the second detent comprising a pair of eyelets integrally extending from the other flange. A mounting rod is received through the eyelets in frictional, surface-to-surface contact therewith to retain the visor panel in any desired angular position. The mounting rod includes a flat thereon within which the tab on the clip is received when the visor panel is moved to a stored position to retain the panel in that position. The tab also provides a torque for "snapping" the visor panel into its stored position as the panel is moved thereto. The guide means on the clip comprises a pair of claw-shaped end extensions of the clip which are compressed into slidable engagement with the interior of a channel provided in the edge of the visor panel and within which the clip and mounting rod are received, to accommodate movement of the visor panel along the mounting rod. The channel is closed at the ends thereof by a pair of hollow bushings which slidably receive the mounting rod therethrough and function as bearings for the sliding movement of the visor panel along the rod.

BEST MODE FOR CARRYING OUT THE INVENTION AND INDUSTRIAL CAPABILITY THEREOF

Figure 1:
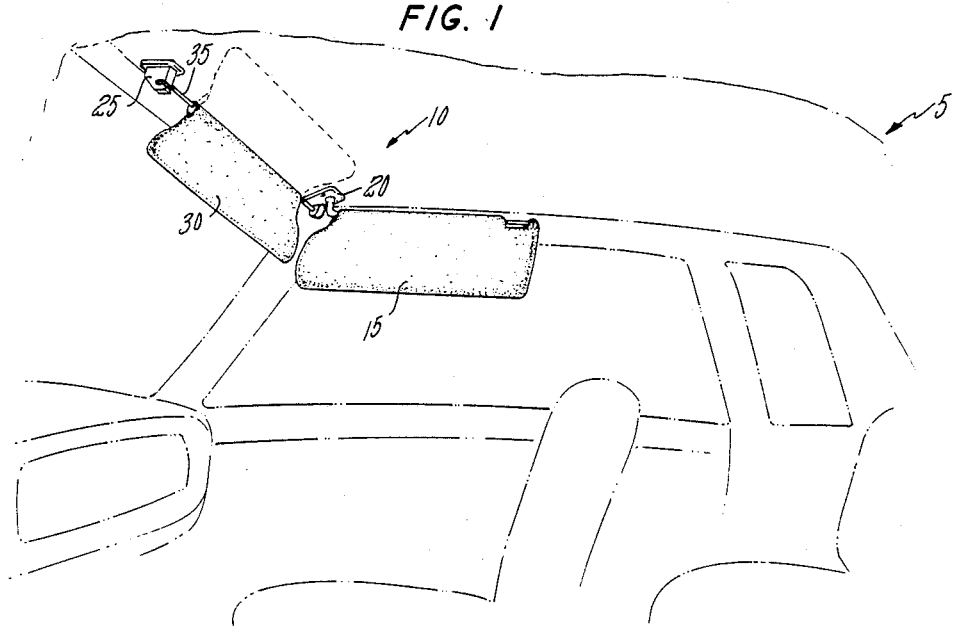
FIG. 1 is a perspective view of a vehicle sun shade of the type employing the sun visor mounting arrangement of the present invention.

Referring to FIG. 1, the interior of a vehicle such as an automobile or the like is shown in phantom at 5 and includes a sun shade assembly 10 comprising a main visor panel 15 mounted on bracket 20 and pivotable between a position adjacent the top of the vehicle windshield where the panel may be clipped to bracket 25, and a position adjacent to a side window of the vehicle. Sun shade assembly 10 also includes an auxiliary visor 30 mounted on a rod 35 in accordance with the present invention.

Referring to FIGS. 2-6, auxiliary visor panel 30 includes an open-ended channel 40 along a forward edge thereof, channel 40 being plugged by hollow plastic bushings 45 press fit into the ends of the channel which slidably receive rod 35 therethrough. The through-openings in bushings 45 are dimensional such that the bushings slide smoothly over the rod to bear the lateral movement of the visor panel as its position along the rod is adjusted.

Channel 40 accommodates a mounting clip 50 formed from spring steel or the like which is generally U-shaped, comprising a pair of flanges 55 interconnected by a bight portion 60. One the flanges includes a tab 65 extending integrally therefrom while the other flange includes a pair of open eyelets 70 extending integrally therefrom. The clip also includes U-shaped extensions 75 at either end thereof, the extensions having claw-shaped, compressible plastic guides 80 provided thereon by such techniques as insert molding or the like.

Figure 2:
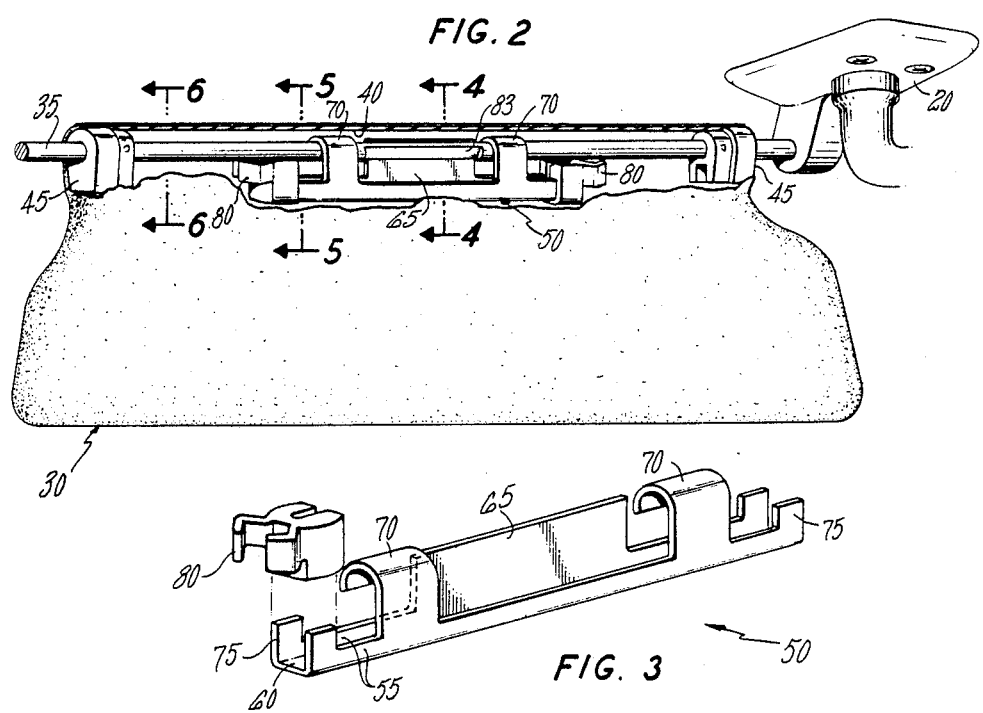
FIG. 2 is an enlargement of one of the visor panels illustrated in FIG. 1, portions thereof being broken away to show the mounting arrangement therefor.
Figure 3:
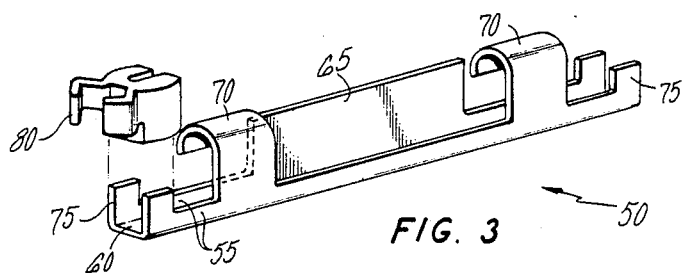
FIG. 3 is a partially exploded isometric view of a clip employed in the mounting arrangement of the present invention.
Figure 4:
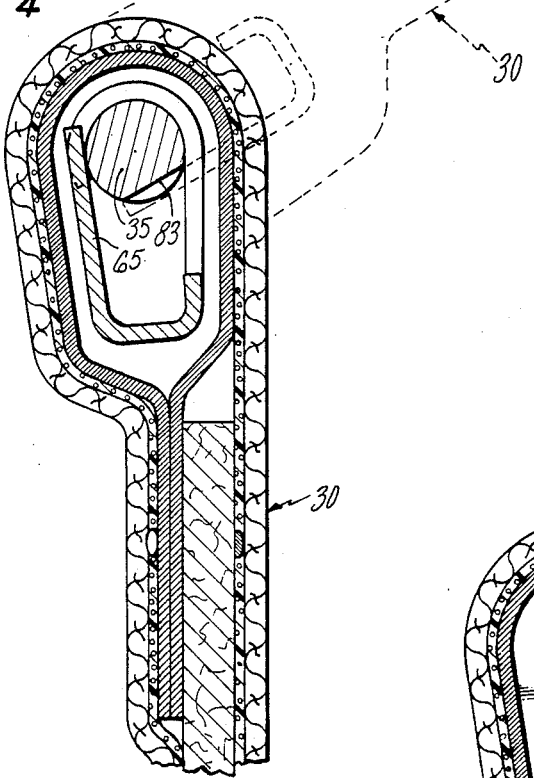
FIG. 4 is an enlarged sectional view taken in the direction of line 4—4 of FIG. 2, the phantom lines of FIG. 4 showing the visor and mounting clip in a stored position.
Figure 6:
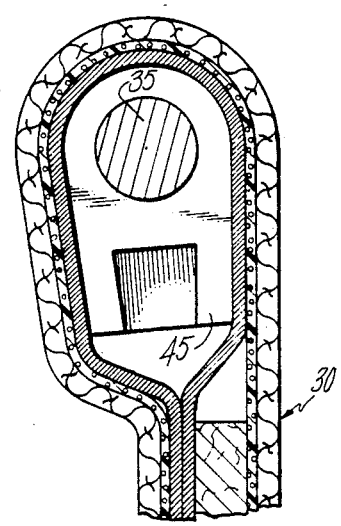
FIG. 6 is a sectional view taken in the direction of line 6—6 of FIG. 2.
Figure 5:
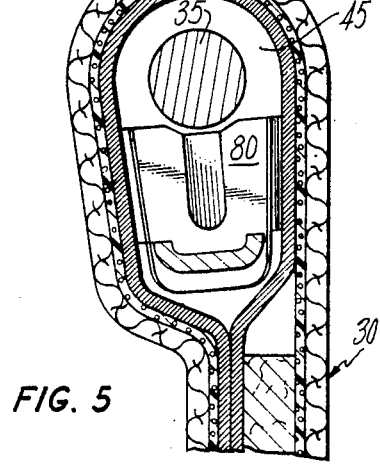
FIG. 5 is a sectional view taken in the direction of line 5—5 of FIG. 2.

As best seen in FIG. 2, mounting rod 35 includes a flat 83 thereon and is received through clip 50 being in frictional surface-to-surface contact therewith along a portion of the inner surface of tab 65 and the interior surfaces of eyelets 70.

In the assembly of visor panel 30 to rod 35, mounting clip 50 is slid over the rod to the location corresponding to alignment of tab 65 with flat 83 on the rod. Claw-shaped guides 80 are compressed and the visor panel is then slid over the clip-rod subassembly. Bushings 45 are then slid over the rod into press fit engagement with the interior of the ends of channel 40. The rod is then mounted at the forward edge of the vehicle roof between brackets 20 and 25 by any suitable arrangement (not shown) to prevent rotation of the rod as the visor is pivoted thereabout.

It will be appreciated that the mounting arrangement of the present invention, comprising a single mounting clip and a pair of simple plastic bushings is economical to manufacture and easy to assemble. The bushings and claw-shaped plastic guides 80 on mounting clip 50 provide for a smooth traversal of rod 35 by the visor as the position of the visor is laterally adjusted. Moreover, the bushings absorb the impact energy between the visor panel and brackets 20 and 25 to minimize the risk of the crushing of the panel against the brackets as the panel is positioned at either end of rod 35. Tab 65 seats within flat 83 on rod 35 to firmly maintain the visor in a stored position against the ceiling of the vehicle. The resilience of the tab provides a torque to "snap" the visor into its stored position as it is pivoted into that position by the user thereof. The frictional, surface-to-surface contact between the rod and the interior surfaces of eyelets 70 firmly holds the visor in any angular position thereof yet provides for a smooth pivoting of the visor about the rod. It will be appreciated that the eyelets 70, which frictionally hold the visor panel in angularly adjusted positions are not required to retain the visor panel in its stored position, that function being performed by the engagement of tab 65 with flat 83. Accordingly, tab 65 and eyelets 70 perform their respective functions generally without compromise for optimal ease of operation in adjusting the position of the visor panel. The compression of claw-shaped end extensions 80 within visor channel 40 take up any clearances between the clip and visor channel due to normal manufacturing tolerances to minimize annoying vibrations and rattles.

While a particular embodiment of the sun visor mounting arrangement of the present invention has been illustrated and described, it will be appreciated that various modifications may be made thereto without departing from the present invention. For example, while the mounting arrangement of the present invention has been described and illustrated within the context of an auxiliary visor panel, it will be understood that a similar mounting arrangement may be employed with a main visor panel. Thus, it is intended by the following claims to cover any such modifications as fall within the true spirit and scope of this invention.

Having thus described the invention, what is claimed is:

1. In a vehicle sun shade, said sun shade comprising a visor panel longitudinally movable along a mounting rod therefor, the improvement characterized by:
    said visor panel including a channel extending the length of said visor panel along an edge thereof; and
    a mounting clip disposed within said channel and receiving said mounting rod therethrough, said mounting clip comprising a generally U-shaped base portion including a pair of upstanding flanges connected by a bight portion and including:
    a resilient tab integrally extending from one of said flanges and receivable on a flat provided on said mounting rod for maintaining said visor panel in a stored angular position on said mounting rod;
    at least one eyelet integrally extending from the other of said flanges and receiving said mounting rod therethrough, in frictionally pivotable surface-to-surface contact therewith for accommodating the angular positioning of said visor about said mounting rod; and
    guide means comprising a pair of claw-shaped end extensions, compressively received within said channel to accommodate sliding longitudinal movement of said visor panel over said clip.

2. The automobile sun shade of claim 1 characterized by said clip being formed from spring steel and said claw-shaped extensions being formed from resilient plastic.

3. The automobile sun shade of claim 1 characterized by:
    means for supporting said mounting rod within the interior of said vehicle; and
    first and second bushings disposed at the ends of said channel and accommodating said mounting rod therethrough for bearing said longitudinal movement of said visor panel over said mounting rod and dissipating the energy of impact between the end of said visor panel and said means for supporting said mounting rod within the interior of said vehicle.

4. The automobile sun shade of claim 3 characterized by said first and second bushings being formed from a plastic and received at least partially within the ends of said channel to provide closures therefor.

* * * * *